(12) United States Patent
Kawase et al.

(10) Patent No.: US 10,150,435 B2
(45) Date of Patent: Dec. 11, 2018

(54) VEHICLE LOWER PORTION STRUCTURE

(71) Applicant: TOYOTA JIDOSHA KABUSHIKI KAISHA, Toyota-shi, Aichi-ken (JP)

(72) Inventors: Kyosuke Kawase, Okazaki (JP); Junichi Takayanagi, Nagoya (JP); Kenichiro Yoshimoto, Tokai (JP); Daisuke Tanabe, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/802,574

(22) Filed: Nov. 3, 2017

(65) Prior Publication Data

US 2018/0126933 A1    May 10, 2018

(30) Foreign Application Priority Data

Nov. 8, 2016    (JP) .................. 2016-218458

(51) Int. Cl.
*B60R 16/04* (2006.01)
*B60K 1/04* (2006.01)
*B60L 11/18* (2006.01)

(52) U.S. Cl.
CPC ............ *B60R 16/04* (2013.01); *B60K 1/04* (2013.01); *B60L 11/1877* (2013.01); *B60L 11/1879* (2013.01); *B60K 2001/0438* (2013.01); *B60K 2001/0472* (2013.01); *B60Y 2306/01* (2013.01)

(58) Field of Classification Search
None
See application file for complete search history.

(56) References Cited

U.S. PATENT DOCUMENTS

2014/0284125 A1*    9/2014  Katayama ................ B60K 1/04
                                                                    180/68.5

FOREIGN PATENT DOCUMENTS

JP         2014-124997 A    7/2014

* cited by examiner

*Primary Examiner* — John D Walters
*Assistant Examiner* — Hilary L Johns
(74) *Attorney, Agent, or Firm* — Oliff PLC

(57) ABSTRACT

A cross member is disposed inside a battery case. The cross member extends in the vehicle width direction at a location that overlaps with rockers as seen in the vehicle width direction. The cross member is more resistant to deformation by a load toward the battery case than a cover portion of the battery case. Therefore, when a load toward the battery case is applied, a transmission path for the load from the rocker at one vehicle width direction side to the rocker at the other vehicle width direction side may be formed by the cross member.

7 Claims, 5 Drawing Sheets

VEHICLE LOWER PORTION STRUCTURE

CROSS-REFERENCE TO RELATED APPLICATION

This application is based on and claims priority under 35 USC 119 from Japanese Patent Application No. 2016-218458 filed on Nov. 8, 2016, the disclosure of which is incorporated by reference herein.

TECHNICAL FIELD

The present disclosure relates to a vehicle lower portion structure.

RELATED ART

Japanese Patent Application Laid-Open (JP-A) No. 2014-124997 (Patent Document 1) discloses an invention relating to a floor structure of a vehicle. In this floor structure of a vehicle, a projecting portion is provided at a floor panel. This projecting portion includes an upper plate portion that structures a vehicle upper side thereof and upright wall portions that extend downward towards vehicle outer sides from the upper plate portion. The vehicle lower side of the projecting portion forms a recess portion, the vehicle lower side of which is open. A fuel cell stack (a power supply unit) is accommodated in this recess portion.

However, a structure that is desirable is a structure in which a vehicle body structural member at one vehicle width direction side and a vehicle body structural member at the other vehicle width direction side are linked by a cross member or the like in order to brace against a collision load from the one vehicle width direction side at the time of a side collision of the vehicle ("during a side collision" hereinafter). However, when a fuel cell stack is mounted to a vehicle body as described above, it is difficult to form this structure while maintaining the size of the fuel cell stack. Thus, it is necessary to brace a collision load from one vehicle width direction side only with the vehicle body structural member at the one vehicle width direction side.

Accordingly, in the conventional technology recited in Patent Document 1, a flat plate portion protrudes toward the vehicle width direction outer side from a periphery edge portion at each vehicle width direction outer side of the projecting portion. A floor side member is structured to include a cover portion disposed at the vehicle upper side of the flat plate portion and a side member main body portion disposed at the vehicle lower side of the flat plate portion. An end portion at the vehicle width direction outer side of the flat plate portion is joined to a rocker rail that extends in the vehicle front-and-rear direction. A plural number of gussets are arranged along the vehicle front-and-rear direction at the vehicle width direction inner side of the rocker rail. The rocker rail and the floor side member are linked by these gussets, and a collapse of the rocker rail to the vehicle width direction inner side is suppressed by the gussets.

Therefore, in the conventional technology recited in Patent Document 1, although a collision load during a side collision of the vehicle acts through a rocker rail in a direction toward the fuel cell stack, the collision load is transmitted through the gussets to the floor side member and is braced. Thus, a collision load from one vehicle width direction side during a side collision of the vehicle may be braced by the vehicle body structural member only at the one vehicle width direction side, without the vehicle body structural member at the other vehicle width direction side being employed.

However, provided the size of a fuel cell stack can be maintained, it is desirable to form a structure that may transmit a load directed toward the fuel cell stack from a vehicle body structural member at one vehicle width direction side to a vehicle body structural member at the other vehicle width direction side. In other words, there is scope for improvement over the conventional technology recited in Patent Document 1 in regard to transmitting a load directed toward a fuel cell stack from a vehicle body structural member at one vehicle width direction side to a vehicle body structural member at the other vehicle width direction side even though the size of the fuel cell stack is maintained.

SUMMARY

In consideration of the circumstances described above, an object of the present disclosure is to provide a vehicle lower portion structure that may both maintain the size of a power supply unit and, even when the power supply unit has been installed, transmit a load directed toward the power supply unit from a vehicle body structural member at one vehicle width direction side to a vehicle body structural member at the other vehicle width direction side.

A vehicle lower portion structure according to a first aspect includes: a floor panel structuring a portion of a floor portion of a vehicle body; a pair of vehicle body structural members that extend in a vehicle front-and-rear direction along periphery edge portions at vehicle width direction outer sides of the floor panel and that structure portions of the vehicle body; a power supply unit capable of supplying electric power to a power unit installed at the vehicle body, the power supply unit including a battery case and a battery module, the battery case being disposed at the vehicle lower side of the floor panel at the vehicle width direction inner side of the vehicle body structural members, and the battery module being accommodated in a cover portion that structures a portion of the battery case; and a reinforcing portion that structures a portion of the battery case or is disposed at the inside of the battery case, that extends in the vehicle width direction at a location that overlaps with the vehicle body structural members as seen in the vehicle width direction, and that is more resistant to deformation by a load toward the battery case than the cover portion.

According to the first aspect, a portion of the floor portion of the vehicle body is structured by the floor panel, and each vehicle body structural member structuring a portion of the vehicle body extends in the vehicle front-and-rear direction along the periphery edge portion at the vehicle width direction outer side of the floor panel. The power unit is installed at the vehicle body and electric power is supplied to the power unit from the power supply unit. The power supply unit is provided with the battery case and the battery module that is accommodated in the cover portion constituting a portion of the battery case. The battery case is disposed at the vehicle lower side of the floor panel, at the vehicle width direction inner side of the vehicle body structural members.

Now, a structure that is desirable is a structure that, when a load toward the battery case caused by a collision of the vehicle or the like is braced against, may transmit the load from the vehicle body structural member at one vehicle width direction side to the vehicle body structural member at the other vehicle width direction side. Therefore, it is necessary to provide, for example, a load transmission member that links the vehicle body structural member at the one vehicle width direction side with the vehicle body structural member at the other vehicle width direction side. However, as described above, the power supply unit is disposed between the vehicle body structural member at the one vehicle width direction side and the vehicle body structural member at the other vehicle width direction side, and it is thought to be difficult to link these vehicle body structural members together with a load transmission member. A structure in which vehicle body structural members are linked together and a power supply unit is disposed so as to avoid a load transmission member has been considered, but in this structure it is difficult to maintain the size of the power supply unit.

Anyway, in the first aspect, the reinforcing portion that is provided constitutes a portion of the battery case or is disposed at the inside of the battery case. The reinforcing portion extends in the vehicle width direction at a location that, seen in the vehicle width direction, overlaps with the vehicle body structural members. The reinforcing portion is more resistant than the cover portion of the battery case to deformation by a load toward the battery case. Therefore, when a load toward the battery case is applied, a transmission path for the load from the vehicle body structural member at one vehicle width direction side to the vehicle body structural member at the other vehicle width direction side may be formed by the reinforcing portion. Furthermore, compared to the above-mentioned structure in which a power supply unit is disposed so as to avoid a load transmission member, effects on the exterior shape of the battery case of the power supply unit may be suppressed.

In the vehicle lower portion structure according to a second aspect, in the first aspect: the vehicle body structural members each include a rocker that is formed as a chamber structure whose cross-sectional shape, seen in the vehicle front-and-rear direction, is a chamber; and the vehicle lower portion structure further includes a pair of side cross portions that extend in the vehicle width direction between the rockers and the cover portion at a location that overlaps with the reinforcing portion and the rockers as seen in the vehicle width direction, each side cross portion being more resistant to deformation by a load toward the battery case than the cover portion and being specified to have a lower rigidity with respect to a collision load in the vehicle width direction than the corresponding rigidity of the reinforcing portion.

According to the second aspect, each rocker is arranged along the periphery edge portion at the vehicle width direction outer side of the floor panel, and has the chamber structure in which the cross-sectional shape thereof viewed in the vehicle front-and-rear direction is a chamber. Therefore, a collision load from one vehicle width direction side during a side collision of the vehicle deforms the rocker at the one side, and the collision load is transmitted toward the reinforcing portion with a portion of the collision load having been absorbed.

Each side cross portion is provided between the rocker and the cover portion of the battery case. The side cross portion extends in the vehicle width direction at a location that, seen in the vehicle width direction, overlaps with the reinforcing portion and the rocker. The side cross portion is more resistant than the cover portion to deformation by a load toward the battery case, and is specified to have a lower rigidity with respect to a collision load in the vehicle width direction than the corresponding rigidity of the reinforcing portion. Therefore, when a collision load from one vehicle width direction side during a side collision of the vehicle is larger than a predetermined load, a portion of the collision load is absorbed by deformation of the side cross portion. Thus, in the second aspect, deformation of the reinforcing portion by a collision load during a side collision of the vehicle may be suppressed.

In the vehicle lower portion structure according to a third aspect, in the second aspect: the floor panel includes a bulge portion that bulges to form a protrusion to the vehicle upper side at a vehicle width direction central portion of the floor panel, and protruding portions in plate shapes that protrude to each vehicle width direction outer side from the bulge portion; the each protruding portion structures a region at the vehicle upper side of the side cross portion, and an end portion at the vehicle width direction outer side of the protruding portion is joined to a region at the vehicle upper side of the rocker; a region at the vehicle lower side of the side cross portion is structured by a lower side panel portion disposed at the vehicle lower side of the protruding portion, an end portion at the vehicle width direction outer side of the lower side panel portion being joined to a region at the vehicle lower side of the rocker; and the side cross portion is formed by the protruding portion and the lower side panel portion as a chamber structure portion whose cross-sectional shape, seen in the vehicle width direction, is a chamber.

According to the third aspect, the bulge portion is provided that bulges to form a protrusion toward the vehicle upper side at the vehicle width direction central portion of the floor panel, and the power supply unit may be disposed at the inside of the bulge portion.

Each plate-shaped protruding portion that is provided protrudes to the vehicle width direction outer side from the bulge portion. The end portion at the vehicle width direction outer side of the protruding portion is joined to the region at the vehicle upper side of the rocker. The lower side panel portion is disposed at the vehicle lower side of the protruding portion, and the end portion at the vehicle width direction outer side of the lower side panel portion is joined to the region at the vehicle lower side of the rocker. The region at the vehicle upper side of the side cross portion is constituted by the protruding portion, the region at the vehicle lower side of the side cross portion is constituted by the lower side panel portion, and the side cross portion is formed as the chamber structure portion whose cross-sectional shape viewed in the vehicle width direction is a chamber. Thus, rigidity with respect to a load in the vehicle vertical direction is provided to each side cross portion, and this load may be supported by the side cross portions, the floor panel and the rockers.

As described above, the vehicle lower portion structure according to the first aspect has excellent effects in that the size of the power supply unit may be maintained and, even when the power supply unit has been installed, a load toward the power supply unit may be transmitted from the vehicle body structural member at one vehicle width direction side to the vehicle body structural member at the other vehicle width direction side.

The vehicle lower portion structure according to the second aspect has an excellent effect in that a reliability with which a collision load from one vehicle width direction side during a side collision of the vehicle is transmitted from the rocker at the one vehicle width direction side to the rocker at the other vehicle width direction side may be improved.

The vehicle lower portion structure according to the third aspect has excellent effects in that the power supply unit may be increased in size and in that effects of a load in the vehicle vertical direction on the side cross portions may be suppressed.

DETAILED DESCRIPTION

Figure 1:
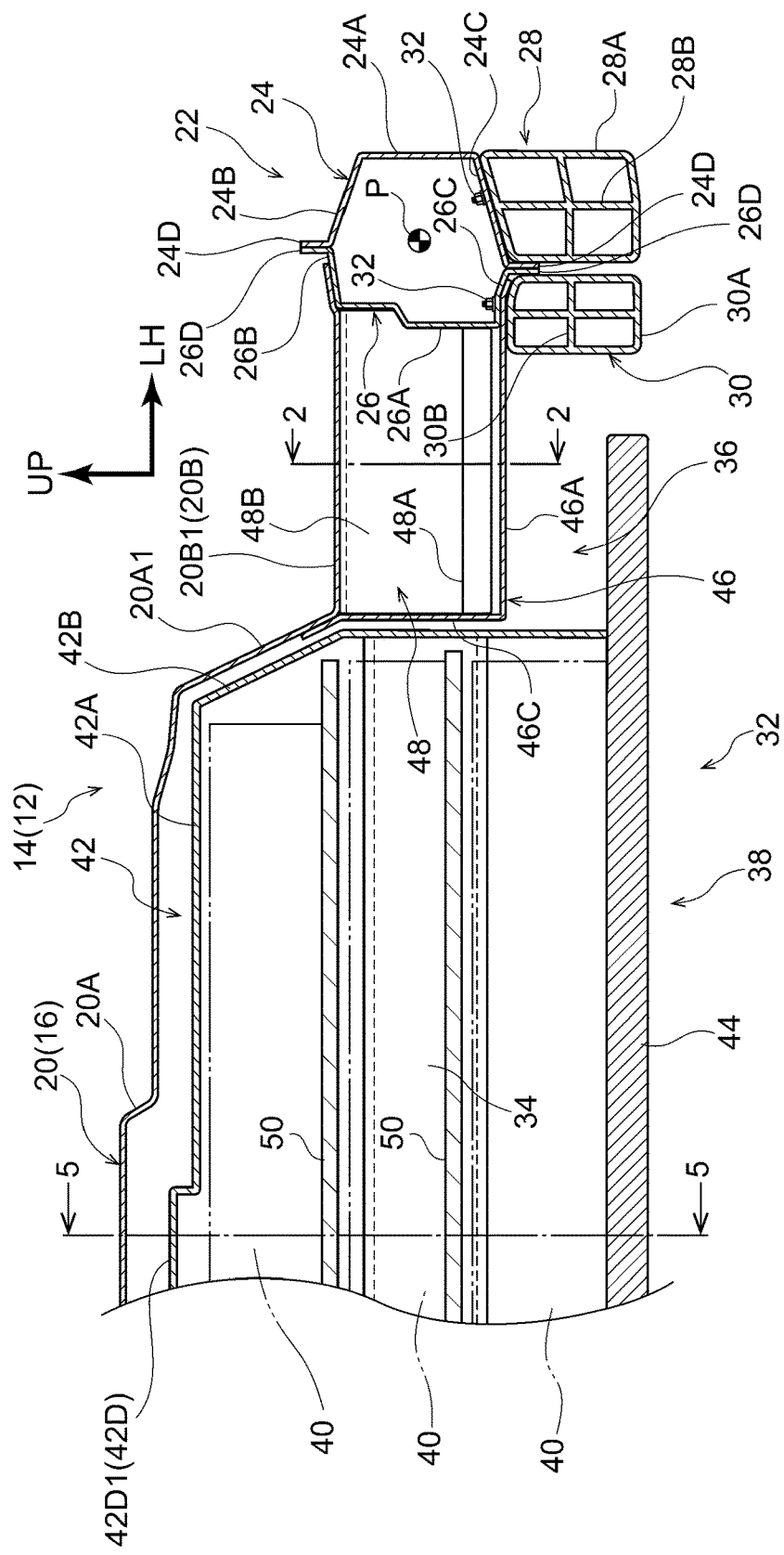
FIG. 1 is a magnified sectional diagram seen from the vehicle front side (a sectional diagram showing a state cut along line 1-1 in FIG. 5), showing structures of a floor portion of a vehicle in which a vehicle lower portion structure according to a present exemplary embodiment is employed.

Herebelow, an exemplary embodiment of a vehicle lower portion structure according to the present disclosure is described using FIG. 1 to FIG. 5. An arrow FR that is shown as appropriate in the drawings indicates a vehicle front side, an arrow UP indicates a vehicle upper side, and an arrow LH indicates a vehicle width direction left side.

Figure 4:
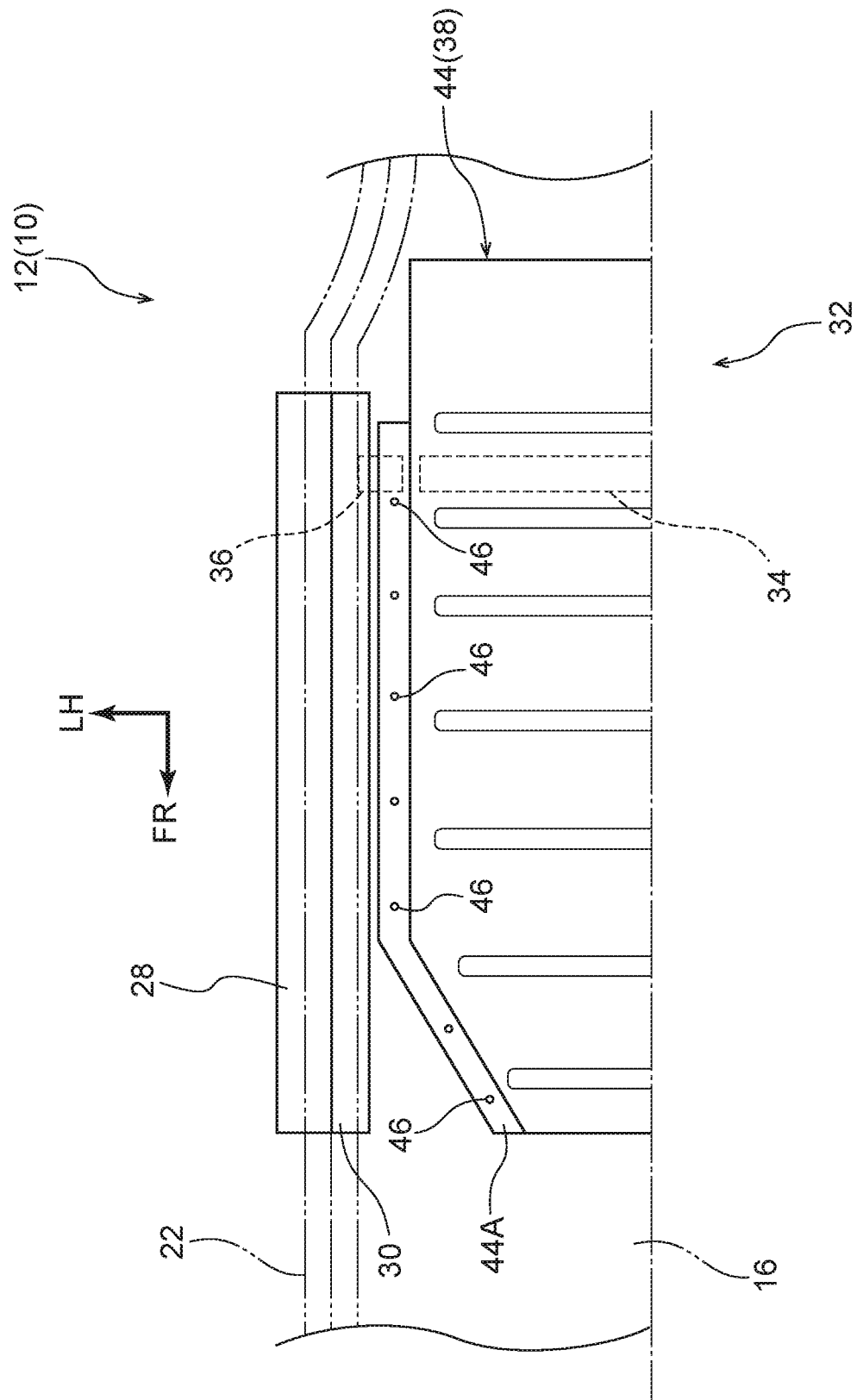
FIG. 4 is a bottom view seen from the vehicle lower side (a view in the direction of arrow 4 in FIG. 5), showing structures of the floor portion of the vehicle in which the vehicle lower portion structure according to the present exemplary embodiment is employed.
Figure 5:
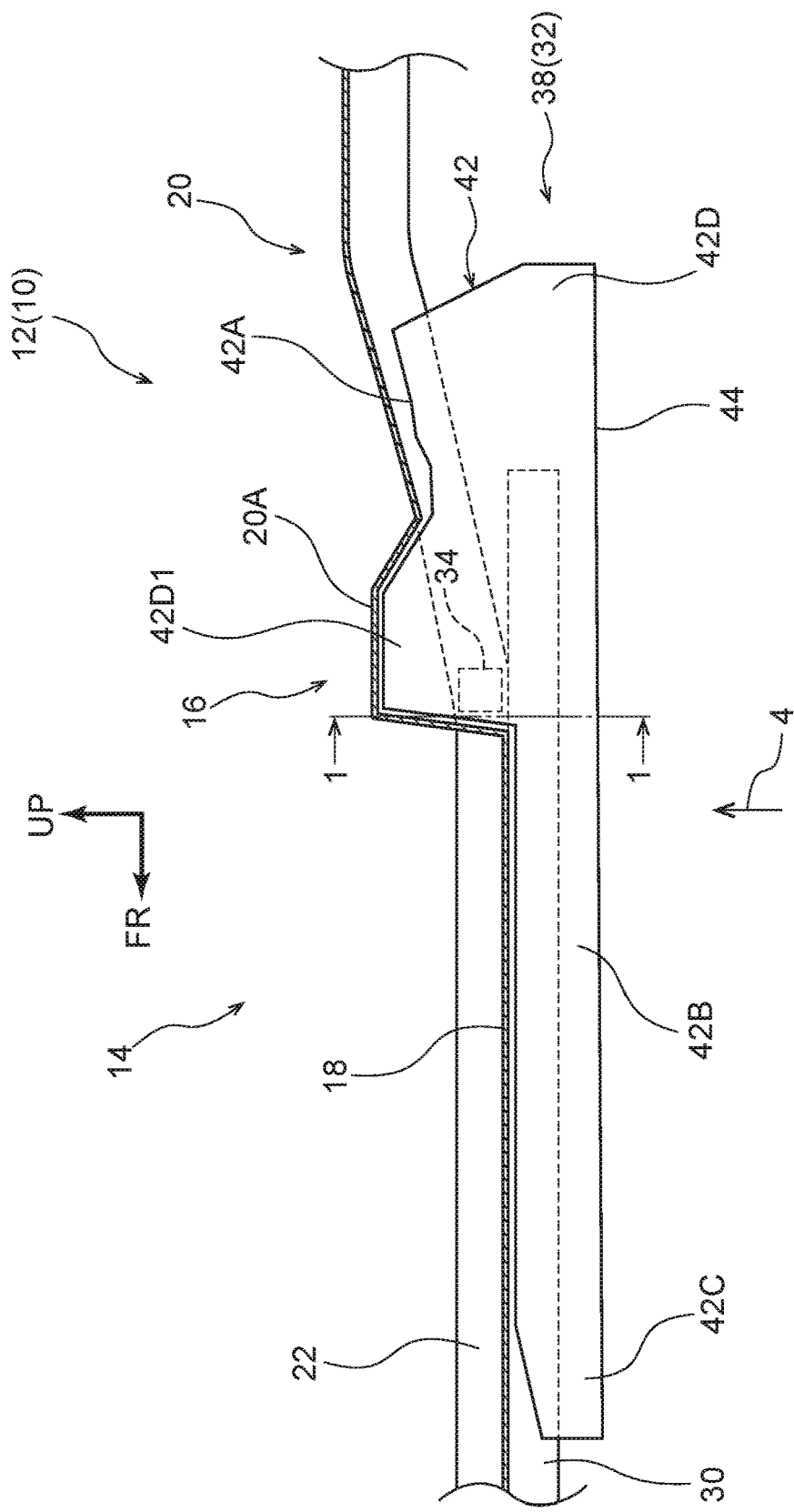
FIG. 5 is a sectional diagram seen in the vehicle width direction (a sectional diagram showing a state cut along line 5-5 in FIG. 1), showing overall structures of the floor portion of the vehicle in which the vehicle lower portion structure according to the present exemplary embodiment is employed.

First, general structures of a vehicle 10 in which the vehicle lower portion structure according to the present exemplary embodiment is employed are described using FIG. 4 and FIG. 5. In the present exemplary embodiment, the vehicle 10 is basically structured with left-right symmetry. Accordingly, structures in a region at the vehicle width direction left side of the vehicle 10 are principally described below; descriptions of structures in the region at the vehicle width direction right side are omitted as appropriate.

The vehicle 10 includes a vehicle body 12, a power unit such as a motor or the like, and a battery pack 32 that serves as a power supply unit. The power unit, which is not shown in the drawings, is mounted to the vehicle body 12. Similarly, the battery pack 32, which is described below, is mounted to the vehicle body 12. The power unit is supplied and driven with electric power from the battery pack 32, and the vehicle 10 runs by driving force generated by the power unit.

The vehicle body 12 is provided with a floor panel 16 that structures a portion of a floor portion 14 at the vehicle lower side of the vehicle body 12. As seen in the vehicle vertical direction, the floor panel 16 extends in the vehicle front-and-rear direction and the vehicle width direction. The floor panel 16 is formed by pressing of steel plate, and includes a front panel portion 18 and a rear panel portion 20. The front panel portion 18 principally forms a region at the vehicle front side of the floor panel 16 and the rear panel portion 20 forms a region at the vehicle rear side.

More specifically, the front panel portion 18 is formed in a plate shape that extends in the vehicle front-and-rear direction and the vehicle width direction. The front panel portion 18 is reinforced by plural bead portions, which are not shown in the drawings, being formed. A bulge portion 20A that bulges to form a protrusion to the vehicle upper side is formed at the rear panel portion 20. A dimension of the bulge portion 20A in the vehicle width direction is set to a length of around 60 to 70% of a vehicle width direction dimension of the rear panel portion 20. As is described in more detail below, a portion of the battery pack 32 is accommodated at the inside of the bulge portion 20A.

At the vehicle width direction outer side of the floor panel 16, a rocker 22 that serves as a vehicle body structural member is disposed along a periphery edge portion at the vehicle width direction outer side of the floor panel 16. The rocker 22 extends in the vehicle front-and-rear direction, and includes a rocker outer 24 and a rocker inner 26. The rocker outer 24 structures a portion at the vehicle width direction outer side of the rocker 22 and the rocker inner 26 structures a portion at the vehicle width direction inner side of the rocker 22.

In more detail, as shown in FIG. 1, the rocker outer 24 includes a side wall portion 24A, an upper wall portion 24B, a lower wall portion 24C, and a pair of flange portions 24D. A cross-sectional shape of the rocker outer 24 seen in the vehicle front-and-rear direction is formed in a hat shape whose vehicle width direction inner side is open. The side wall portion 24A constitutes a portion at the vehicle width direction outer side of the rocker outer 24. The side wall portion 24A is formed in a plate shape that extends in the vehicle front-and-rear direction with the plate thickness direction in the vehicle width direction. The upper wall portion 24B protrudes upward toward the vehicle inner side from a periphery edge portion at the vehicle upper side of the side wall portion 24A. The lower wall portion 24C projects downward toward the vehicle inner side from a periphery edge portion at the vehicle lower side of the side wall portion 24A. The flange portions 24D project to the vehicle upper side from a periphery edge portion at the vehicle upper side of the upper wall portion 24B and to the vehicle lower side from a periphery edge portion at the vehicle lower side of the lower wall portion 24C.

The rocker inner 26 has a structure that is basically symmetrical with the rocker outer 24 about an axis extending in the vehicle vertical direction. Specifically, the rocker inner 26 includes a side wall portion 26A, an upper wall portion 26B, a lower wall portion 26C, and a pair of flange portions 26D. A cross-sectional shape of the rocker inner 26 seen in the vehicle front-and-rear direction is formed in a hat shape whose vehicle width direction outer side is open. The flange portions 24D and flange portions 26D are joined together at joining portions by welds or the like, which are not shown in the drawings. Thus, the rocker outer 24 and rocker inner 26 form a chamber structure whose cross-sectional shape seen in the vehicle front-and-rear direction is a substantially hexagonal chamber.

An impact absorber 28 (below referred to as "the energy absorber 28") that serves as a vehicle body structural member is disposed at the vehicle lower side of the rocker outer 24. An impact absorber 30 (below referred to as "the energy absorber 30") that also serves as a vehicle body structural member is disposed at the vehicle lower side of the rocker inner 26. The energy absorber 28 is formed of an extruded aluminium member, and includes a square tube-shaped main body portion 28A and a reinforcing wall portion 28B. The main body portion 28A extends in the vehicle front-and-rear direction, and the reinforcing wall portion 28B is provided inside the main body portion 28A. A cross-sectional shape of the reinforcing wall portion 28B seen in the length direction of the main body portion 28A is formed in a cross shape.

Thus, a cavity inside the main body portion 28A is divided in four by the reinforcing wall portion 28B.

The energy absorber 30 includes a main body portion 30A and a reinforcing wall portion 30B, and has a similar structure to the energy absorber 28. The energy absorber 28 is fixed to the lower wall portion 24C of the rocker outer 24 by fastening members 32 such as bolts or the like, and the energy absorber 30 is fixed to the lower wall portion 26C of the rocker inner 26 by the fastening members 32.

In the present exemplary embodiment, the battery pack 32 is disposed at the vehicle lower side of the floor panel 16. A cross member 34 that serves as a reinforcing portion is provided at the inside of the battery pack 32. This is a first characteristic of the present exemplary embodiment. A side cross portion 36 including a portion of the floor panel 16 is also provided. This is a second characteristic of the present exemplary embodiment. Below, structures of the battery pack 32, the cross member 34 and the side cross portion 36 that constitute principal portions of the present exemplary embodiment are described in detail.

First, structures of the battery pack 32 are described using FIG. 1 and FIG. 5. The battery pack 32 includes a battery case 38 fabricated of aluminium, which serves as a battery case constituting an outer casing of the battery pack 32, and a battery module 40, which is disposed at the inside of the battery case 38.

The battery case 38 is provided with a cover portion 42 and a base portion 44. The cover portion 42 covers the battery module 40 from the vehicle upper side thereof. The base portion 44 supports the battery module 40 from the vehicle lower side thereof. The cover portion 42 includes an upper wall portion 42A and a pair of side wall portions 42B. The upper wall portion 42A constitutes a portion at the vehicle upper side of the cover portion 42. The side wall portions 42B constitute portions at the vehicle width direction outer sides of the cover portion 42, with plate thickness directions thereof in the vehicle width direction.

A front portion 42C at the vehicle front side of the cover portion 42 is structured with a dimension in the vehicle vertical direction that is basically constant. A dimension of the front portion 42C in the vehicle front-and-rear direction is set to around 60% of an overall dimension of the cover portion 42 in the vehicle front-and-rear direction. A rear portion 42D at the vehicle rear side of the cover portion 42 is provided with a bulge portion 42D1 at the vehicle rear side of the upper wall portion 42A. The bulge portion 42D1 is provided in a shape that is a step smaller than the bulge portion 20A of the floor panel 16. A dimension of the rear portion 42D in the vehicle vertical direction is set to be longer than the dimension of the front portion 42C in the vehicle vertical direction. That is, seen in the vehicle width direction, the cover portion 42 is formed in a step shape whose vehicle rear side is higher.

Meanwhile, the base portion 44 is formed in a plate shape that is specified to be a step larger than the cover portion 42 as seen in the vehicle vertical direction, with a larger plate thickness than the plate thickness of the cover portion 42. In a state in which the cover portion 42 is disposed at the vehicle upper side of the base portion 44, the cover portion 42 is mounted to the base portion 44 by fastening members or the like, which are not shown in the drawings. As shown in FIG. 4, plural insertion portions, which are not shown in the drawings, are provided along an edge portion 44A at the vehicle width direction outer side of the base portion 44. Fastening members 46 such as bolts or the like are inserted into the insertion portions from the vehicle lower side thereof, and are fastened to fastener-receiving portions of a side member structuring the vehicle body 12, which is not shown in the drawings. Thus, the battery case 38 is fixed to the vehicle body 12.

Returning to FIG. 1, a plural number of the battery module 40 are arranged in the vehicle front-and-rear direction inside the battery case 38. The battery modules 40 are arranged in one layer inside the front portion 42C and arranged in three layers in the vehicle vertical direction inside the rear portion 42D. Of these battery modules 40, the battery modules 40 that are disposed in a first layer are mounted to the base portion 44 by unillustrated fixing members. A plural number of stand portions, which are not shown in the drawings, are provided in the rear portion 42D of the cover portion 42 of the base portion 44. Table portions 50 fabricated of aluminium are formed in plate shapes with the plate thickness direction in the vehicle vertical direction. The table portions 50 are disposed at two levels in the vehicle vertical direction and are mounted to the stand portions. The battery modules 40 that are disposed in a second layer and a third layer are mounted at the table portions 50. Plate thicknesses of the table portions 50 are specified to be greater than the plate thickness of the cover portion 42. Thus, the table portions 50 function as reinforcing portions, as described below.

In the state in which the battery pack 32 is mounted to the vehicle body 12, the bulge portion 42D1 of the cover portion 42 and the battery modules 40 in the third layer, which are disposed inside the bulge portion 42D1, are disposed at the inside of the bulge portion 20A of the rear panel portion 20. The battery pack 32 is disposed at the vehicle width direction inner side of the rocker 22 and the energy absorber 30 in a state in which there is a gap between the battery pack 32 and the floor panel 16. The side cross portion 36 is provided between the battery pack 32 and the rocker 22.

The side cross portion 36 includes a protruding portion 20B, a lower side panel portion 46 and a reinforcing panel portion 48. The protruding portion 20B constitutes a portion of the rear panel portion 20 and protrudes in a plate shape to the vehicle width direction outer side from the bulge portion 20A. The lower side panel portion 46 and reinforcing panel portion 48 are disposed at the vehicle lower side of the protruding portion 20B.

Figure 2:
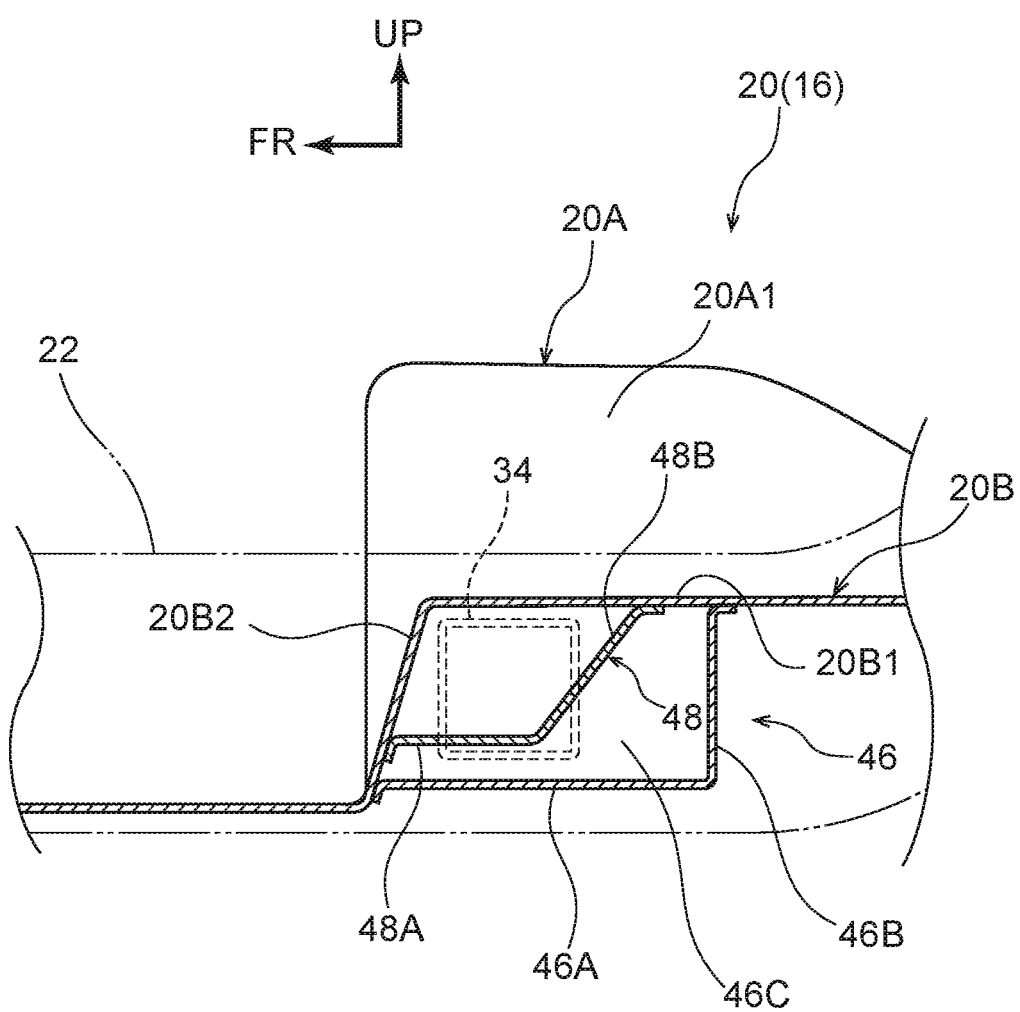
FIG. 2 is a sectional diagram seen from the vehicle width direction outer side (a sectional diagram showing a state cut along line 2-2 in FIG. 1), showing local structures of the floor portion of the vehicle in which the vehicle lower portion structure according to the present exemplary embodiment is employed.
Figure 3:
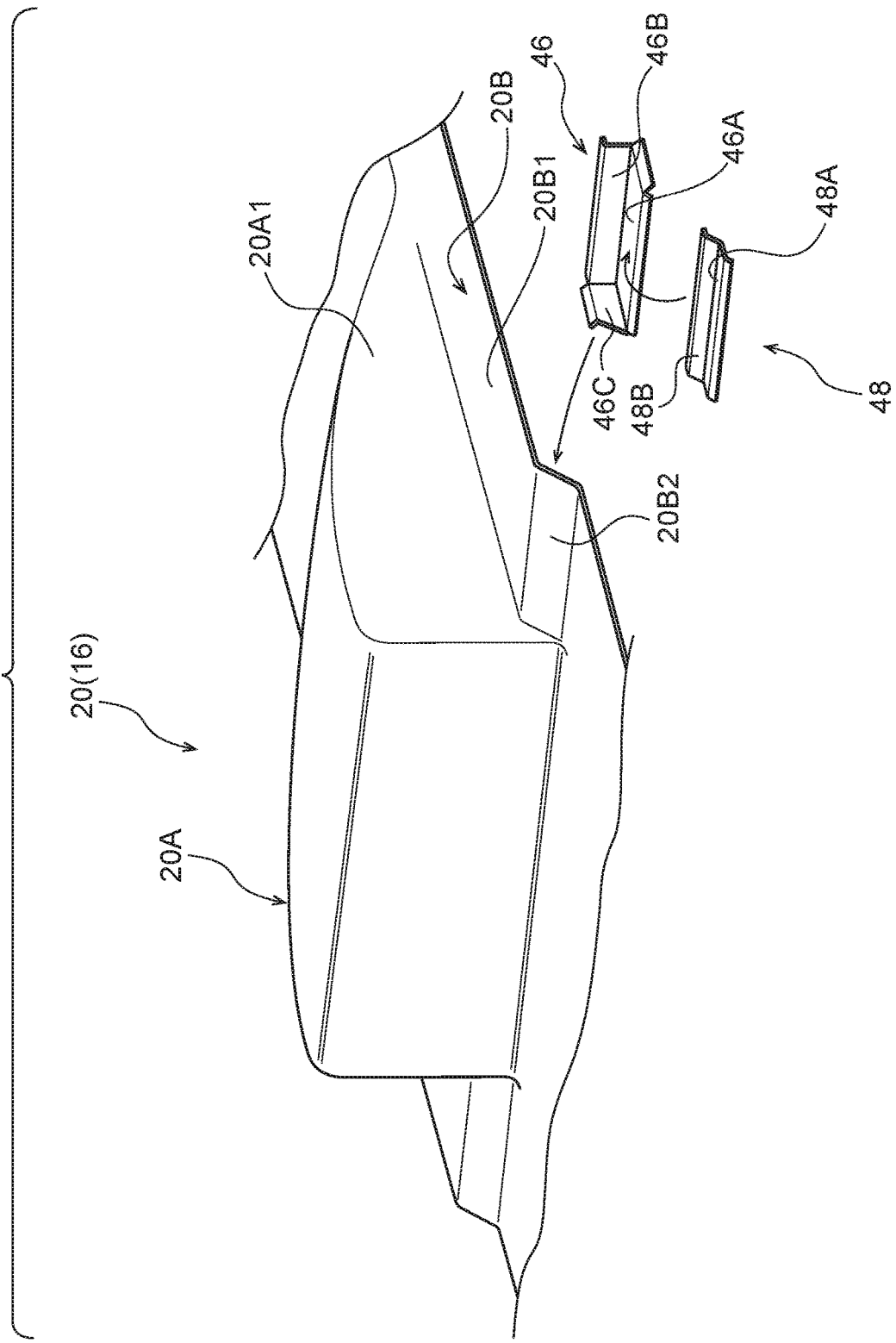
FIG. 3 is an exploded perspective view schematically showing structures of the floor portion of the vehicle in which the vehicle lower portion structure according to the present exemplary embodiment is employed.

As shown in FIG. 2 and FIG. 3, the protruding portion 20B includes an upper side protruding portion 20B1 and a front side protruding portion 20B2. The upper side protruding portion 20B1 constitutes the vehicle upper side of the protruding portion 20B and the plate thickness direction thereof is in the vehicle vertical direction. The front side protruding portion 20B2 constitutes the vehicle front side of the protruding portion 20B and the plate thickness direction thereof is substantially in the vehicle front-and-rear direction. An end portion at the vehicle width direction outer side of the upper side protruding portion 20B1 is joined to the upper wall portion 26B of the rocker inner 26 at a joining portion by a weld or the like, which is not shown in the drawings.

The lower side panel portion 46 includes a first panel portion 46A, a second panel portion 46B and a third panel portion 46C. The first panel portion 46A constitutes the vehicle lower side of the lower side panel portion 46, the second panel portion 46B constitutes the vehicle rear side, and the third panel portion 46C constitutes the vehicle width direction inner side. The first panel portion 46A is formed in a plate shape with a plate thickness direction in the vehicle vertical direction. Seen in the vehicle vertical direction, the first panel portion 46A is formed in a rectangular shape whose longer direction is in the vehicle width direction. The second panel portion 46B protrudes to the vehicle upper side from a periphery edge portion at the vehicle rear side of the first panel portion 46A. The second panel portion 46B is formed in a plate shape with a plate thickness direction in the vehicle front-and-rear direction and, seen in the vehicle front-and-rear direction, is formed in a rectangular shape whose longer direction is in the vehicle width direction. The third panel portion 46C protrudes to the vehicle upper side from a periphery edge portion at the vehicle width direction inner side of the first panel portion 46A. The third panel portion 46C is formed in a plate shape with a plate thickness direction in the vehicle width direction and, seen in the vehicle width direction, is formed in a rectangular shape.

An end portion at the vehicle width direction outer side of the first panel portion 46A is joined to the lower wall portion 26C of the rocker inner 26 at a joining portion by an unillustrated weld or the like. An end portion at the vehicle front side of the first panel portion 46A is joined to the front side protruding portion 20B2 of the protruding portion 20B at a joining portion by an unillustrated weld or the like. An end portion at the vehicle upper side of the second panel portion 46B is joined to the upper side protruding portion 20B1 of the protruding portion 20B at a joining portion by an unillustrated weld or the like. An end portion at the vehicle upper side of the third panel portion 46C is joined to a side wall portion 20A1, which constitutes the vehicle width direction outer side of the bulge portion 20A, at a joining portion by an unillustrated weld or the like.

Thus, the side cross portion 36 is formed by the protruding portion 20B and the lower side panel portion 46 as a chamber structure whose cross-sectional shape seen in the vehicle width direction is a rectangular closed chamber, with the protruding portion 20B constituting a region at the vehicle upper side of the side cross portion 36 and the lower side panel portion 46 constituting a region at the vehicle lower side of the side cross portion 36. The battery pack 32 is disposed at the vehicle width direction inner side of the third panel portion 46C; a predetermined gap is formed between the battery pack 32 and the third panel portion 46C. The upper side protruding portion 20B1 of the protruding portion 20B may be joined to the side wall portion 26A of the rocker inner 26, provided the upper side protruding portion 20B1 is disposed at the vehicle upper side relative to a center P of the cross-section of the rocker 22 seen in the vehicle front-and-rear direction at the portion of the rocker 22 at which the side cross portion 36 is provided. Moreover, the first panel portion 46A of the lower side panel portion 46 may be joined to the side wall portion 26A of the rocker inner 26, provided the first panel portion 46A is disposed at the vehicle lower side relative to the center P.

The reinforcing panel portion 48 is disposed inside a cavity bounded by the protruding portion 20B, the lower side panel portion 46 and the rocker inner 26. The reinforcing panel portion 48 includes a lower side reinforcing plate portion 48A and an upper side reinforcing plate portion 48B. The lower side reinforcing plate portion 48A is formed in a plate shape with a plate thickness direction in the vehicle vertical direction and, seen in the vehicle vertical direction, is formed in a rectangular shape whose longer direction is in the vehicle width direction. The lower side reinforcing plate portion 48A is disposed at the vehicle lower side relative to a vehicle vertical direction central portion of the second panel portion 46B of the lower side panel portion 46. An end portion at the vehicle front side of the lower side reinforcing plate portion 48A is joined to the front side protruding portion 20B2 of the protruding portion 20B at a joining portion by a weld or the like.

The upper side reinforcing plate portion 48B protrudes rearward toward the vehicle upper side from a periphery edge portion at the vehicle rear side of the lower side reinforcing plate portion 48A. The upper side reinforcing plate portion 48B is formed in a plate shape with, seen in the plate thickness direction thereof, a rectangular shape whose longer direction is in the vehicle width direction. An end portion at the vehicle upper side of the upper side reinforcing plate portion 48B is joined to the upper side protruding portion 20B1 of the protruding portion 20B at a joining portion by a weld or the like. An end portion at the vehicle width direction inner side of the reinforcing panel portion 48 abuts against the third panel portion 46C of the lower side panel portion 46, and an end portion at the vehicle width direction outer side of the reinforcing panel portion 48 abuts against the rocker inner 26.

As shown in FIG. 1 and FIG. 2, the cross member 34 is formed in a square tube shape extending in the vehicle width direction by an extruded aluminium member. Seen in the vehicle width direction, the cross member 34 is disposed at a location that overlaps with the rocker 22 and the side cross portion 36. Thus, a cross-sectional shape of the cross member 34 seen in the vehicle width direction forms a rectangular chamber. To be specific, seen in the vehicle width direction, the cross member 34 is accommodated inside a rectangular frame formed by the protruding portion 20B and the lower side panel portion 46, inside the battery case 38 and more specifically inside the bulge portion 42D1 of the cover portion 42. As is schematically illustrated in FIG. 4, the cross member 34 and the side cross portion 36 are disposed on the same straight line extending in the vehicle width direction, and this line is orthogonal to an axial line of the rocker 22. An end portion of the cross member 34 abuts against the side wall portion 42B of the cover portion 42, but this end portion may be separated from the side wall portion 42B.

The cross member 34 is constituted to be more resistant to deformation by a load toward the battery case 38 than the cover portion 42. The meaning of this is that if a load of the same magnitude toward the vehicle width direction inner side is applied to each of the cross member 34 and the cover portion 42, a deformation amount of an end portion at the vehicle width direction outer side of the cross member 34 from an initial position thereof (a deformation stroke) is smaller than a deformation amount of the side wall portion 42B of the cover portion 42 from an initial position thereof.

Similarly to the cross member 34, the side cross portion 36 is constituted to be more resistant to deformation by a load toward the battery case 38 than the cover portion 42. The aforementioned table portions are also constituted to be more resistant to deformation by a load toward the battery case 38 than the cover portion 42.

The Young's modulus of a rigid material constituting the side cross portion 36 is represented by E1, and a moment of inertia of area of the cross-section of the side cross portion 36 seen in the vehicle width direction (i.e., the protruding portion 20B, the lower side panel portion 46 and the reinforcing panel portion 48) is represented by I1. The Young's modulus of the aluminium constituting the cross member 34 is represented by E2, and the moment of inertia of area of the cross-section of the cross member 34 seen in the vehicle width direction is represented by I2. The present exemplary embodiment is specified such that $E1 \times I1 < E2 \times I2$. Thus, it may be understood that the rigidity of the side cross portion 36 with respect to a load in the vehicle width direction is set lower than the corresponding rigidity of the cross member 34. As an example, the side cross portion 36 may be constituted so as to be crushed when subjected to a load of 160 kN in the vehicle width direction.

—Operation and Effects of the Present Exemplary Embodiment—

Now, operation and effects of the present exemplary embodiment are described.

In the present exemplary embodiment, a portion of the floor portion 14 of the vehicle body 12 is structured by the floor panel 16, and the rocker 22 constituting a portion of the vehicle body 12 along the periphery edge portion at each vehicle width direction outer side of the floor panel 16 extends in the vehicle front-and-rear direction. The power unit is installed at the vehicle body 12. Electric power is supplied to the power unit from the battery pack 32 that is provided with the battery case 38 and with the battery modules 40 that are accommodated in the cover portion 42 constituting a portion of the battery case 38. The battery case 38 is disposed at the vehicle lower side of the floor panel 16, at the vehicle width direction inner side of the rocker 22.

During a side collision of the vehicle 10, it is likely that a collision load toward the battery case 38 in the vehicle width direction will be applied to the vehicle 10. During a frontal collision of the vehicle 10 too, due to the vehicle body 12 being deformed by a collision load and the like, it is likely that a load toward the battery case 38 will be applied. When a load toward the battery case 38 that is caused by a collision of the vehicle 10 or the like is to be braced against, it is desirable for a structure to be formed that may transmit the load from the rocker 22 at one vehicle width direction side to the rocker 22 at the other vehicle width direction side.

Therefore, it is necessary to provide, for example, a load transmission member that substantially linearly links the rocker 22 at the one vehicle width direction side with the rocker 22 at the other vehicle width direction side. However, as described above, the battery pack 32 is disposed between the rocker 22 at the one vehicle width direction side and the rocker 22 at the other vehicle width direction side. Thus, it is thought to be difficult to link the rockers 22 together substantially linearly with a load transmission member. Although a structure in which the rockers 22 are linked to one another and the battery pack 32 is disposed so as to avoid the load transmission member can be considered, in this structure it is difficult to maintain the size of the battery pack 32.

In the present exemplary embodiment, the cross member 34 is provided, which is disposed at the inside of the battery case 38. The cross member 34 extends in the vehicle width direction at a location that overlaps with the rockers 22 as seen in the vehicle width direction, and is more resistant than the cover portion 42 of the battery case 38 to deformation by a load toward the battery case 38. Therefore, when a load is applied toward the battery case 38, a transmission path for the load from the rocker 22 at one vehicle width direction side to the rocker 22 at the other vehicle width direction side may be formed by the cross member 34. Moreover, compared to the above-mentioned structure in which the battery pack 32 is disposed so as to avoid a load transmission member, effects on the exterior shape of the battery case 38 of the battery pack 32 may be suppressed.

Therefore, in the present exemplary embodiment, the size of the battery pack 32 may be maintained and, even though the battery pack 32 is installed, a load toward the battery pack 32 may be transmitted from the rocker 22 at one vehicle width direction side to the rocker 22 at the other vehicle width direction side.

In the present exemplary embodiment, each rocker 22 is arranged along the periphery edge portion at the vehicle width direction outer side of the floor panel 16, and has a chamber structure in which the cross-sectional shape thereof viewed in the vehicle front-and-rear direction is a closed chamber. Therefore, a collision load from one vehicle width direction side during a side collision of the vehicle deforms the rocker 22 at the one side, and the collision load is transmitted toward the reinforcing portion with a portion of the collision load having been absorbed.

The side cross portion 36 is provided between each rocker 22 and the cover portion 42 of the battery case 38. The side cross portion 36 extends in the vehicle width direction at a location that overlaps with the cross member 34 and the rocker 22 as seen in the vehicle width direction. The side cross portion 36 is more resistant than the cover portion 42 to deformation by a load toward the battery case 38, and is specified to have a lower rigidity with respect to a collision load in the vehicle width direction than the corresponding rigidity of the cross member 34. Therefore, if a collision load from one vehicle width direction side during a side collision of the vehicle 10 is larger than a predetermined load, a portion of the collision load is absorbed by the side cross portion 36 being crushed in an axial direction thereof. Because the side cross portion 36 is reinforced by the reinforcing panel portion 48, cross-sectional buckling of the side cross portion 36 when the side cross portion 36 is being crushed is suppressed.

Thus, in the present exemplary embodiment, deformation of the cross member 34 by a collision load during a side collision of the vehicle 10 may be suppressed. Consequently, a reliability with which a collision load from one vehicle width direction side during a side collision of the vehicle 10 is transmitted from the rocker 22 at the one vehicle width direction side to the rocker 22 at the other vehicle width direction side may be improved.

In the present exemplary embodiment, the bulge portion 20A is provided, which bulges to form a protrusion to the vehicle upper side at the vehicle width direction central portion of the floor panel 16, and the battery pack 32 may be disposed at the inside of the bulge portion 20A.

The protruding portions 20B are provided at the floor panel 16 in plate shapes that protrude to the vehicle width direction outer sides from the bulge portion 20A. The end portion at the vehicle width direction outer side of each protruding portion 20B is joined to a region at the vehicle upper side of the rocker 22. The lower side panel portion 46 is disposed at the vehicle lower side of the protruding portion 20B. The end portion at the vehicle width direction outer side of the lower side panel portion 46 is joined to a region at the vehicle lower side of the rocker 22. A region at the vehicle upper side of the side cross portion 36 is constituted by the protruding portion 20B and a region at the vehicle lower side of the side cross portion 36 is constituted by the lower side panel portion 46. In addition, the side cross portion 36 is formed as a chamber structure portion whose cross-sectional shape viewed in the vehicle width direction is a closed chamber. Thus, the side cross portion 36 is provided with rigidity with respect to a load in the vehicle vertical direction, and this load may be supported by the side cross portion 36, the floor panel 16 and the rocker 22.

Therefore, in the present exemplary embodiment, the battery pack 32 may be increased in size and effects on the side cross portions 36 of loads in the vehicle vertical direction may be suppressed.

Moreover, in the present exemplary embodiment the table portions are provided at the inside of the battery case 38. The table portions too are more resistant than the cover portion 42 to deformation by a load toward the battery case 38. Therefore, when a load toward the battery case 38 is applied, a transmission path for the load from the rocker 22 at one vehicle width direction side to the rocker 22 at the other vehicle width direction side may be formed by the table portions.

—Supplementary Descriptions of the Above Exemplary Embodiment—

(1) In the exemplary embodiment described above, the battery case 38 and the cross member 34 are formed as separate bodies, but the battery case 38 and cross member 34 may be structured as a single body. Further, a location at which the cross member 34 is disposed is not limited to the inside of the bulge portion 42D1 but may be at the inside of the front portion 42C of the battery case 38. In this case, the cross member 34 forms a transmission path for a load from the energy absorbers 28 and 30 at one vehicle width direction side to the energy absorbers 28 and 30 at the other vehicle width direction side.

(2) In the exemplary embodiment described above, the battery case 38 is fabricated of aluminium, but the battery case 38 may be constituted of a fiber reinforced resin such as carbon fiber reinforced plastic (CFRP) or the like. The cross member 34 may also be constituted of a fiber reinforced resin such as CFRP or the like or may be constituted of steel, depending on structures of the vehicle body 12 and the battery case 38 and expected loads towards the battery case 38. The cross-sectional shape of the cross member 34 seen in the vehicle width direction is not limited to a rectangular shape but may, depending on the shape of the battery case 38 and the like, be any of various shapes such as a hexagonal shape, a cross shape or the like.

(3) In the exemplary embodiment described above, a predetermined gap is formed between the battery pack 32 and each side cross portion 36, but a structure is possible in which a gap-filling member is disposed in this gap. According to this structure, free running of the side cross portion 36 when a collision load is applied in the vehicle width direction may be suppressed.

(4) Further, in the exemplary embodiment described above, each side cross portion 36 includes the protruding portion 20B, the lower side panel portion 46 and the reinforcing panel portion 48, but this is not limiting. For example, a side cross portion may be structured that includes the protruding portion 20B, a lower side panel provided with portions corresponding to the first panel portion 46A and the third panel portion 46C, a rear side panel corresponding to the second panel portion 46B, and a front side panel that is disposed at the vehicle front side of the rear side panel to oppose the rear side panel.

(5) Further still, the side cross portions 36 are provided at the vehicle body 12 in the exemplary embodiment described above, but a structure that is not provided with the side cross portions 36 is possible, depending on the structure of the vehicle body 12. According to this structure, the battery pack 32 may be made even larger.

What is claimed is:

1. A vehicle lower portion structure comprising:
   a floor panel structuring a portion of a floor portion of a vehicle body;
   a pair of vehicle body structural members that extend in a vehicle front-and-rear direction along periphery edge portions at vehicle width direction outer sides of the floor panel and that structure portions of the vehicle body;
   a power supply unit capable of supplying electric power to a power unit installed at the vehicle body, the power supply unit including a battery case and a battery module, the battery case being disposed at a vehicle lower side of the floor panel at the vehicle width direction inner side of each of the vehicle body structural members, and the battery module being accommodated in a cover portion that structures a portion of the battery case; and
   a reinforcing portion that structures a portion of the battery case or is disposed at an inside of the battery case, the reinforcing portion extending in the vehicle width direction and disposed at a location that overlaps with the vehicle body structural members as seen in the vehicle width direction so that a line extending in the vehicle width direction through the reinforcing portion intersects and passes through the vehicle body structural members, the reinforcing portion being more resistant to deformation by a load applied toward the battery case than the cover portion.

2. The vehicle lower portion structure according to claim 1, wherein:
   the vehicle body structural members are rockers, each of which is formed as a chamber structure whose cross-sectional shape, seen in the vehicle front-and-rear direction, is a chamber; and
   the vehicle lower portion structure further includes a pair of side cross portions that extend in the vehicle width direction between the rockers and the cover portion at a location that overlaps with the reinforcing portion and the rockers as seen in the vehicle width direction so that the line that extends in the vehicle width direction also extends through the side cross portions, each of the side cross portions being more resistant to deformation by the load applied toward the battery case than the cover portion and having a lower rigidity with respect to a collision load in the vehicle width direction than a rigidity of the reinforcing portion to the collision load.

3. The vehicle lower portion structure according to claim 2, wherein:
   the floor panel includes
   a bulge portion that bulges to form a protrusion toward a vehicle upper side at a vehicle width direction central portion of the floor panel, and
   protruding portions in plate shapes that protrude to each vehicle width direction outer side from the bulge portion;
   each of the protruding portions structures a region at the vehicle upper side of a corresponding one of the side cross portions, and an end portion at the vehicle width direction outer side of each of the protruding portions is joined to a region at the vehicle upper side of a corresponding one of the rockers;
   a region at the vehicle lower side of each of the side cross portions is structured by a lower side panel portion that is disposed at the vehicle lower side of a corresponding one of the protruding portions, an end portion at the vehicle width direction outer side of each of the lower side panel portions being joined to a region at the vehicle lower side of a corresponding one of the rockers; and
   each of the side cross portions is formed by the corresponding one of the protruding portions and the corresponding one of the lower side panel portions as a chamber structure portion whose cross-sectional shape, seen in the vehicle width direction, is a chamber.

4. The vehicle lower portion structure according to claim 3, wherein each of the side cross portions includes a reinforcing panel portion disposed inside a space bounded by the corresponding one of the protruding portions, the corresponding one of the lower side panel portions and the vehicle width direction inner side of the corresponding one of the rockers, each of the reinforcing panel portions being in a plate shape having a longer direction extending in the vehicle width direction.

5. The vehicle lower portion structure according to claim 1, wherein the power supply unit includes a table portion to which the battery module is mounted, the table portion being more resistant to deformation by the load applied toward the battery case than the cover portion, the table portion corresponding to the reinforcing portion.

6. The vehicle lower portion structure according to claim 1, wherein the battery case and the reinforcing portion are structured as a single body.

7. The vehicle lower portion structure according to claim 2, wherein a gap-filling member is disposed in a gap formed between the cover portion and each of the side cross portions.

* * * * *